United States Patent
Moldoveanu et al.

(10) Patent No.: US 11,774,610 B2
(45) Date of Patent: Oct. 3, 2023

(54) METHODS AND SYSTEMS FOR CONCURRENT LAND VIBROSEIS ACQUISITION WITH SIMULTANEOUS ACTIVATION

(71) Applicant: WesternGeco LLC, Houston, TX (US)

(72) Inventors: Nicolae Moldoveanu, Houston, TX (US); Maurice Nessim, Houston, TX (US); John Quigley, Gatwick (GB); Wadii El Karkouri, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/649,411

(22) PCT Filed: Sep. 21, 2018

(86) PCT No.: PCT/US2018/052191
§ 371 (c)(1),
(2) Date: Mar. 20, 2020

(87) PCT Pub. No.: WO2019/060701
PCT Pub. Date: Mar. 28, 2019

(65) Prior Publication Data
US 2020/0333484 A1 Oct. 22, 2020

Related U.S. Application Data

(60) Provisional application No. 62/561,836, filed on Sep. 22, 2017.

(51) Int. Cl.
*G01V 1/00* (2006.01)
(52) U.S. Cl.
CPC .................. *G01V 1/005* (2013.01)

(58) Field of Classification Search
CPC ...................................................... G01V 1/005
See application file for complete search history.

(56) References Cited

U.S. PATENT DOCUMENTS 6,028,818 A 2/2000 Jeffryes
6,942,059 B2 * 9/2005 Smith .................. G01V 1/3808
181/110

(Continued)

FOREIGN PATENT DOCUMENTS

WO 2015143189 A1 9/2015

OTHER PUBLICATIONS

International Search Report and Written Opinion for Application No. PCT/US2018/52191 dated Dec. 4, 2018.

(Continued)

*Primary Examiner* — Isam A Alsomiri
*Assistant Examiner* — Abdallah Abulaban
(74) *Attorney, Agent, or Firm* — Jeffrey D. Frantz

(57) ABSTRACT

Land seismic survey including providing at least two vibrators in a first group, wherein each vibrator in the first group is assigned to a respective source line, where the source lines of the first group run substantially parallel to one another; providing at least two vibrators in a second group, wherein each vibrator in the second group is assigned to a respective source line that is different than the source lines assigned to vibrators from the first group; actuating the vibrators in the first group simultaneously using different frequency bandwidth sweeps and different phase encodings; actuating the vibrators in the second group at the same time as those in the first group, and simultaneously using different frequency bandwidth sweeps and different phase encodings; and detecting the resulting seismic signals with a plurality of seismic sensors that are placed in contact with the earth and as part of a seismic spread.

20 Claims, 4 Drawing Sheets

(56) References Cited

U.S. PATENT DOCUMENTS

| | | | | |
|---|---|---|---|---|
| 2009/0116337 A1* | 5/2009 | Chiu | ............ | G01V 1/005 367/41 |
| 2012/0075955 A1* | 3/2012 | Dean | ............ | G01V 1/005 367/41 |
| 2012/0147699 A1* | 6/2012 | Dellinger | ............ | G01V 1/005 367/37 |
| 2012/0314536 A1 | 12/2012 | Bagaini | | |
| 2016/0077226 A1* | 3/2016 | Bianchi | ............ | G01V 1/005 367/58 |

OTHER PUBLICATIONS

Bouska, Jack, Distance Separated Simultaneous Sweeping, for Fast, Clean, Vibroseis Acquisition, Geophysical Prospecting, revision accepted Sep. 2009, pp. 123-153.

Howe, David et al., Independent Simultaneous Sweeping—A Method to Increase the Productivity of Land Seismic Crews, 2008, pp. 1-5.

Moldoveanu, Nick et al., High Fidelity Vibratory Seismic in a Difficult Geologic Area, 1999, pp. 1-4.

Translation of the official Notification dated Nov. 18, 2021 by the Patent Office of the Russian Federation, 9 pages.

* cited by examiner

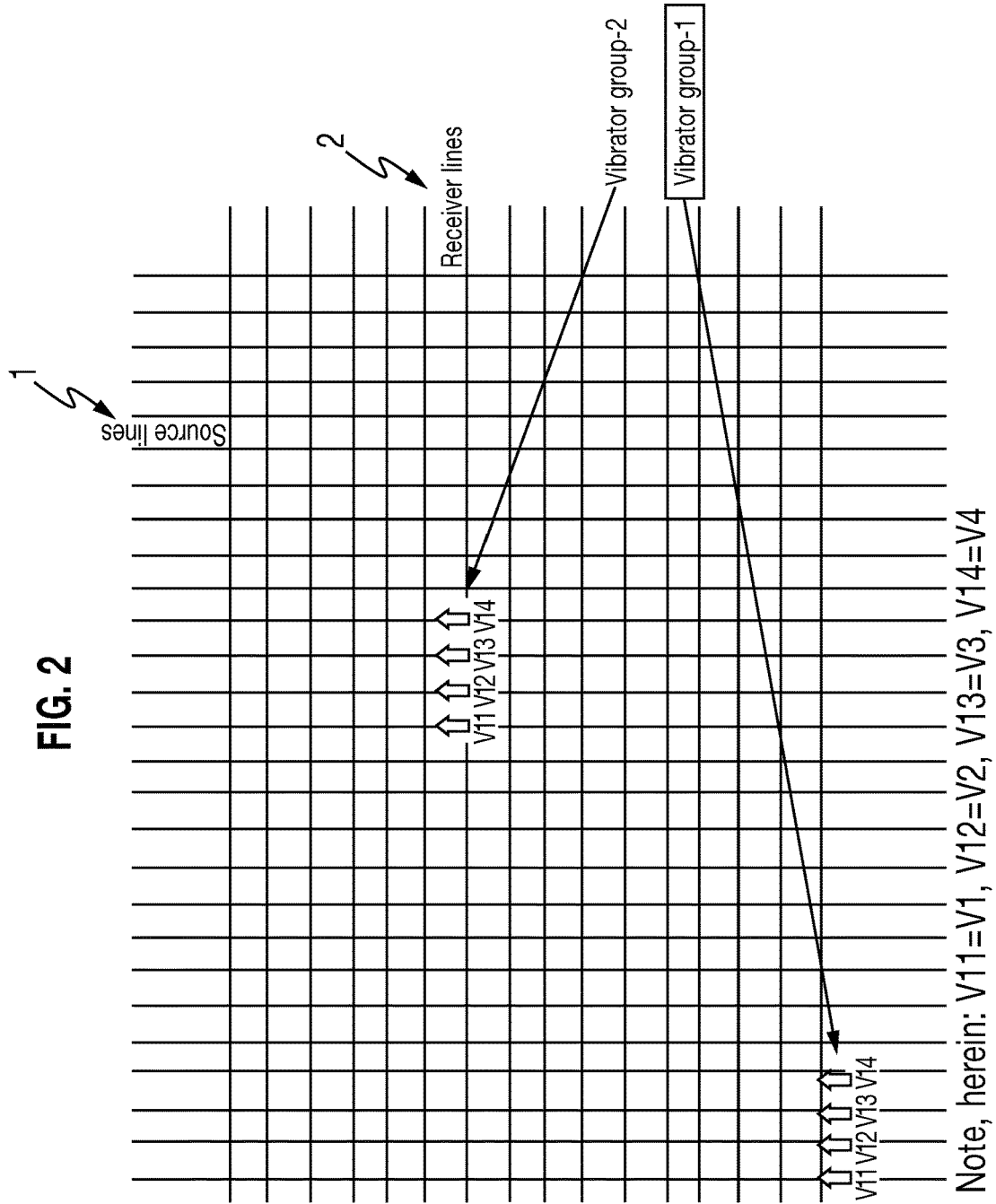
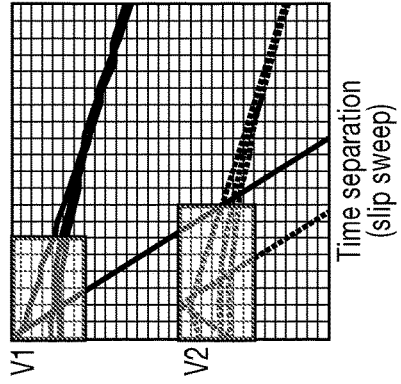
FIG. 1
FIG. 2

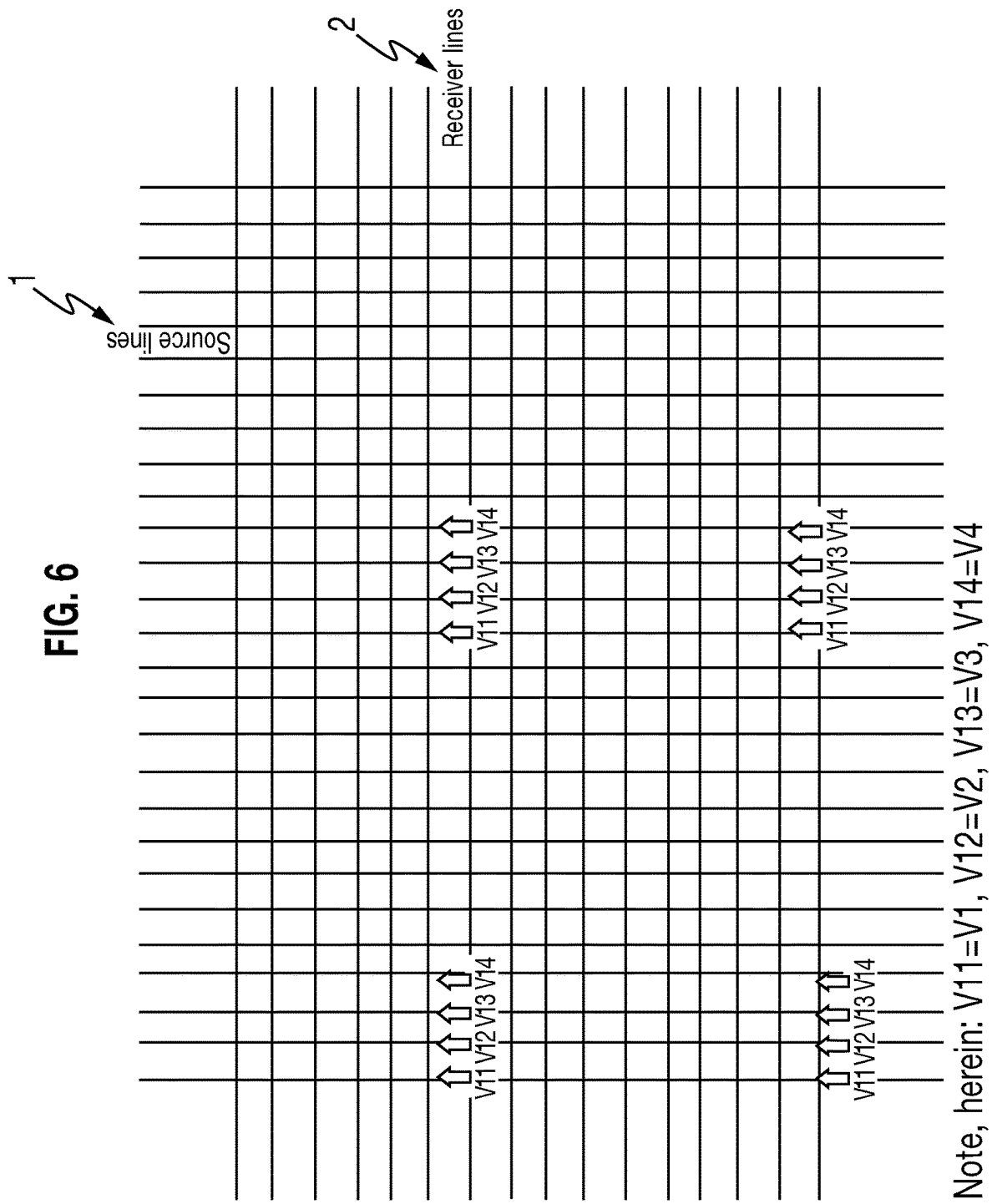

METHODS AND SYSTEMS FOR CONCURRENT LAND VIBROSEIS ACQUISITION WITH SIMULTANEOUS ACTIVATION

CROSS REFERENCE TO RELATED APPLICATIONS

The present application claims priority to U.S. Provisional Application No. 62/561,836 that was filed on Sep. 22, 2017, that application being incorporated by reference herein in its entirety.

TECHNICAL FIELD

The present application and embodiments herein relate hydrocarbon exploration and associated land seismic vibroseis surveys for formation modeling, and more particularly to methods for performing such surveys with groups of multiple vibrators that are actuated simultaneously, and where individual vibrators in each group produce different frequency bandwidth sweeps.

BACKGROUND

Description in the background section is meant to help one skilled in the art understand some of the embodiments described herein, and is not meant to in any way to unduly limit or otherwise unduly influence any subsequent interpretation of present or future claims related to the present application.

A first stage in hydrocarbon exploration generally is seismic exploration. Seismic exploration is used to derive information about subsurface features of the proposed exploration area, that can indicate a presence, or lack thereof, of various minerals and natural items, such as hydrocarbons. Once a likely presence of hydrocarbons is determined, and features of that deposit are determined, extraction may be planned for and eventually take place.

Hydrocarbon extraction involves drilling into an earth formation to establish a well hole, completing that well hole, and several other similarly expensive steps before hydrocarbons can be extracted. It is a very expensive and time-consuming process that creates a premium value for information that can help improve a likelihood of drilling a well such as to successfully access and produce hydrocarbons.

One way of performing seismic exploration is with vibroseis land surveys. In a vibroseis land survey, moveable vibrators (vibroseis units) are used to impute vibration signals into the earth surface, that then reverberate and reflect when encountering formation features, and return to surface. Those signals are detected by seismic sensors that then store/rout the data to a central storage computer memory. The seismic sensors may detect magnitude, particle motion, particle direction and/or pressure. Commercial land seismic surveys use large numbers of seismic sensors that provide large amounts of data that when analyzed can provide information indicating various attributes of the earth formation. The information can indicate the presence, or lack thereof, of hydrocarbons and other minerals and formation attributes.

It is valuable for one skilled in the art to understand the magnitude of normal successful land surveys. Often a successful land survey will involve tens, if not hundreds, of thousands of individual land sensors. At a cost of $10-100 per sensor it is normal that the hardware for a survey can be in the range of $100,000 to more than $100,000,000.

With that high cost of equipment, one way to reduce overall cost is to survey one portion of a survey area with a defined receiver patch, and then move the receiver patch and recording equipment to another portion of the survey area. With that, one can use less equipment and yet end up surveying the entire desired area.

It should also be appreciated that the time it takes to perform a survey is important, especially in view of using the above noted technique of moving equipment from location to location.

SUMMARY

The following summary is meant to aid the understanding of one skilled in the art with regard to embodiments described herein and related claims and is not meant in any way to unduly limit any claims herein or related claims thereto.

A combination of various embodied features includes a method of performing a land seismic vibroseis survey, providing at least two vibrators in a first group, wherein each vibrator in the first group is assigned to a respective source line, where the source lines of the first group run substantially parallel to one another; providing at least two vibrators in a second group, wherein each vibrator in the second group is assigned to a respective source line that is different than the source lines assigned to vibrators from the first group; actuating the vibrators in the first group simultaneously using different frequency bandwidth sweeps and different phase encodings; actuating the vibrators in the second group at the same time as those in the first group, and simultaneously using different frequency bandwidth sweeps and different phase encodings; and detecting the resulting seismic signals with a plurality of seismic sensors that are placed in contact with the earth and as part of a seismic spread.

BRIEF DESCRIPTION OF THE DRAWINGS

The following brief description of the drawings is meant to aid the understanding of one skilled in the art when reviewing this document and any associated claims, and is not meant in any way to unduly limit those or any future related claims.

FIG. 1: shows features relating to a simultaneous vibroseis surveys with two vibrators shooting.

FIG. 2: shows vibroseis concurrent acquisition with 2 groups of vibroseis units separated by a predefined distance; in each group the vibrators sweep simultaneously using split bandwidth sweeps; each vibrator group is independent of each other.

FIG. 6: shows vibroseis concurrent acquisition with four groups of vibroseis units separated by a predefined distance; in each group the vibrators sweep simultaneously using encoded sweeps; each vibrator group is independent of each other.

DETAILED DESCRIPTION

Figure 3:
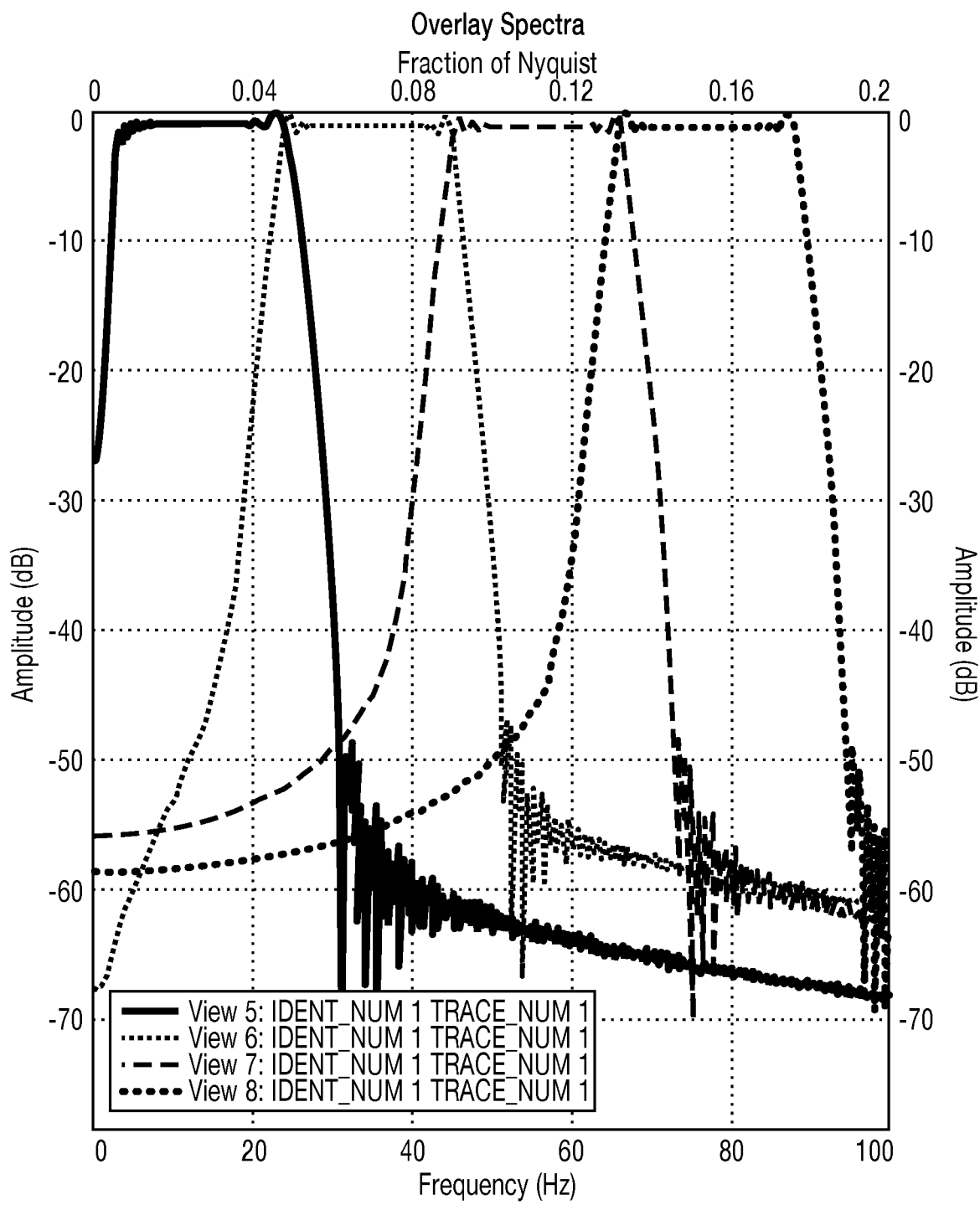
FIG. 3: is a Composite amplitude spectrum of 4 split bandwidth sweeps listed in Table 1.

The following detailed description is meant to aid the understanding of one skilled in the art regarding the various combinations of embodied features described herein and in the claims, as well as future related claims. It is in no way meant to unduly limit those present or future claims.

A challenge to the noted issue of survey speed is the ability to activate vibrators at the same time (or very near thereto) at different locations around a seismic sensor spread (receiver patch). If many shot points can be acquired at the same time or nearly the same time, the receiver patch can be moved quickly to the new location and the total duration of the survey can be reduced. Unfortunately, when vibrators are actuated too close to one another and at the same time or nearly the same time, the signals can interfere with one another when detected by a sensor, thereby degrading the detected data.

The present application describes embodiments relating to new and novel method(s) of actuating land seismic vibrators and performing a seismic survey that provides improved efficiencies to dramatically improve commercial results in the areas of cost, time and efficiency in connection with a land seismic survey.

The present application relates to methods for conducting a land seismic survey using a plurality of land seismic sensors in connection with a plurality of land seismic vibroseis units.

In land seismic vibroseis surveying, and according to embodiments herein, a large number of seismic survey sensors are distributed in connection with the earth. It is possible to use at any one time 10,000, 20,000, 50,000, 100,000 and even up to and more than 200,000 individual land sensors in a survey. Further, it is possible to move a land survey spread involving those numbers of sensors from one area to an adjacent area to eventually complete survey of a total area.

As part of a seismic survey, a vibratory impulse is imputed into the earth. In a simple manner, an impulse can be actuated at any one time. However, using that simple method ensures that the survey will take a very long time and will be commercially less efficient and successful. To improve efficiencies, it is desirable to operate multiple vibrators at the same time. However, complications can arise in that scenario if the signals interfere with one another when detected by a sensor. There are a number of ways to address that issue, such as encoding the signals, and or other separation techniques.

Processing of the data acquired with current land simultaneous shooting treat the seismic interference as noise and noise attenuation methods are applied for active source separation. To achieve successful results, the vibrator units that are firing at the same time need to be separated by a large distance and thus creates a need to use a large receiver spread.

In the present application various embodiments are disclosed that allow closer intervals between vibrator units and also deployment of a smaller receiver spread According to various embodiments, efficiency of a vibroseis survey can be increased if one or more groups of vibrators shoot concurrently over a receiver (sensor) spread. Each group of vibrators may include at least 2, 3 or 4 vibroseis units and each vibroseis unit in a group may sweep at a different frequency bandwidth sweep. In each vibroseis unit could be 1, 2 or more vibrators. There are various mechanical configurations for a vibroseis unit.

As shown in FIG. 1, various features of a simultaneous shooting survey are shown as used for vibroseis land surveys, where the sources (vibroseis units identified as V1 and V2) actuate simultaneously and are separated by a distance in space or can be separated by a firing time interval. If either time separation (slip sweep) or distance separation are employed properly a signal in the defined target area will not undesirably interfere with one another.

FIG. 2 shows a group of four vibroseis units (V1, V2, V3, V4) operating as and in a group. The four vibroseis units (V1, V2, V3, V4) are placed on four adjacent and substantially parallel source lines 1. A source line is a track (imaginary line) that the vibroseis unit is to move along and occasionally activate at predetermined locations and in a predetermined way. Receiver lines 2 are perpendicular to the source lines 1. As shown in FIG. 2, one of the vibroseis devices (V1, V2, V3, V4) is a single vibroseis unit (in some cases a truck). In each group, a vibroseis unit is placed in a respective track as shown, and each vibroseis unit activates simultaneously producing a different frequency bandwidth sweep with a different phase encoding. If for conventional vibroseis acquisition the sweep frequency is 2-90 Hz and the sweep length is 20 sec., with a single sweep per shot point, one implementation is to split 2-90 Hz sweep in four parts, each part having a different bandwidth and different phase. The length of each sweep can then be 5 seconds. Such an embodiment may be: V1: 2-27 Hz, phase=0°; V2=24-48 Hz, phase=90°; V3=45-69 Hz, phase=180°, V4=66-90 Hz, phase=270°. In that case, each vibroseis device stays on the same shot point and sweeps four times, each time with a different bandwidth. This scenario is outlined and described in Table 1. In Table 1, split bandwidth sweeps for a group of four vibroseis devices are placed on four different source lines 1, where each vibroseis device sweeps four times at a same location.

TABLE 1

| SP-11 (line-1) | SP-21 (line-2) | SP-31 (line-3) | SP-41 (line-4) | Shot number | Sweep length | Listening time |
| --- | --- | --- | --- | --- | --- | --- |
| $V_1$: 2-27 Hz Phase = 0° | $V_2$ = 24-48 Hz Phase = 90° | $V_3$ = 45-69 Hz Phase = 180° | $V_4$ = 66-90 Hz Phase = 270° | Shot-1 | 5 sec. | 6 sec. |
| $V_1$ = 24-48 Hz Phase = 90° | $V_2$ = 45-69 Hz Phase = 180° | $V_3$ = 66-90 Hz Phase = 270° | $V_4$ = 2-27 Hz Phase = 0° | Shot-2 | 5 sec. | 6 sec. |
| $V_1$ = 45-69 Hz Phase = 180° | $V_2$ = 66-90 Hz Phase = 270° | $V_3$ = 2-27 Hz Phase = 0° | $V_4$ = 24-48 Hz Phase = 90° | Shot-3 | 5 sec. | 6 sec. |
| $V_1$ = 66-90 Hz Phase = 270° | $V_2$ = 2-27 Hz Phase = 0° | $V_3$ = 24-48 Hz Phase = 90° | $V_4$ = 45-69 Hz Phase = 180° | Shot-4 | 5 sec. | 6 sec. |

According to embodiments shown in FIG. 1 and described in Table 1, to recover a full bandwidth of 2-90 Hz, each shot can be correlated with a proper sweep for each vibroseis device and a vertical sum of the four shots on the same location are performed after correlation. The resulting small overlap between the consecutive frequency bandwidth and the taper applied for each sweep are designed to provide a continuous composite spectrum as shown in FIG. 3.

According to a combination of various embodied features, vibroseis units can be placed at certain distances from one another and can generate sweeps as those described in Table 1. In that scenario, the phase for each sweep in group-2 can be encoded, such as: 45°, 135°, 225° and 315°. In that scenario, the distance between the groups can be based on a survey design and modeling study to assure that the effect of seismic interference in the target zone is minimized to an acceptable level. The second group of vibroseis units may shoot independently of the first group of vibroseis units.

In the scenarios described herein, the number of vibroseis unit groups can be more than two, depending on the survey size. Each vibrator group can have a different number of vibroseis units, and can be 2, 3, 4 or more. A comparison between the sweeping time with an embodied method versus a conventional shooting (no simultaneous shooting) is presented in Table 2 below. Table 2 is a comparison between sweeping time for conventional acquisition (no simultaneous shooting) and split bandwidth simultaneous shooting with one group and two groups of four vibroseis units.

Another group of 4 vibroseis units can be placed at a certain distance and will generate the same sweeps as is described in Table 1. The phase for each sweep in group-2 will be also encoded, for example: 45°, 135°, 225° and 315°. The distance between groups can be based on survey design and modeling study to assure that the effect of seismic interference in the target zone is minimized. The second group of vibroseis units is shot independently of the first group of vibroseis units.

The number of the vibroseis unit groups may be more than two, depending on the survey size. FIG. 6 shows four vibrator groups, each group with four vibrator (units and each vibrator group working independently.

FIG. 6 shows vibroseis concurrent acquisition with four groups of vibroseis units separated by a predefined distance where in each group the vibrators sweep simultaneously using encoded sweeps, and each vibrator group is independent of each other.

Each vibrator group could have a different number of vibroseis units, typically, 2, 3, or 4.

During operations the number of units per group could be changed to accommodate the operational conditions. Changes can be included in the shooting plan prepared during survey planning.

As shown in FIG. 6, two groups of vibrator units (V1, V2, V3, V4) may share source lines wherein the source lines of each group are collinear, or the same, as those of another group.

TABLE 2

| Acquisition parameters | Conventional shooting with a single sweep and a vibroseis unit on 1 source line | Split bandwidth simultaneous shooting with 4 vibroseis units on 4 source lines | | Split bandwidth simultaneous shooting with 8 vibroseis units on 8 source lines | |
|---|---|---|---|---|---|
| | | s = sweep time l = listening time | s + s + s + s + l | s + l + s + l + s + l + s + l | s + s + s + s + l |
| Sweep length | 20 sec. | 5 sec. | 5 sec. | 5 sec. | 5 sec. |
| Listening time | 6 sec. | 6 sec. | 6 sec. | 6 sec. | 6 sec. |
| Number of active shot lines | 1 | 4 | 4 | 8 | 8 |
| Number of sweeps per vibroseis point | 1 | 4 | 4 | 4 | 4 |
| Total time per vibroseis point for a source line | 26 sec. | 11 sec. | 6.5 sec. | 11 sec. | 6.5 sec. |
| Total time per vibroseis point for 4 source lines | 26*4 = 104 sec. | 44 sec. | 26 sec. | 44 sec. | 26 sec. |
| Total time per vibroseis point for 8 source lines | 26*8 = 208 sec. | 44 sec. | 26 sec. | 44 sec. | 26 sec. |

Figure 4:
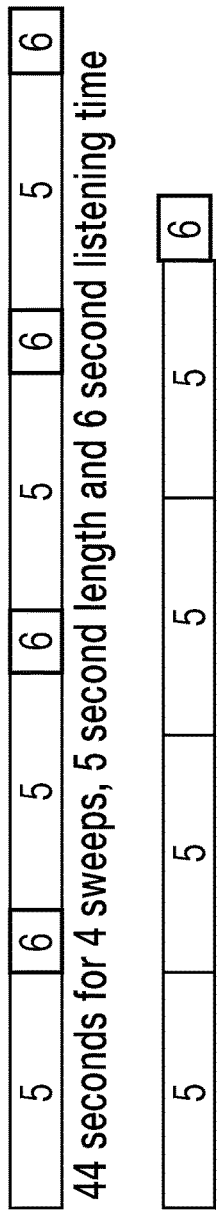
FIG. 4: shows two ways to acquire encoded sweeps with 4 split_bandwidth and phase encoded: sweep1-listen_time, sweep2_listen_time, sweep3_listen_time, sweep4_lisyen time ((ex: for 5 sec sweep and 6 sec listen_time total time=44 sec); sweep1, sweep2, sweep3, sweep4, listen_time (ex: for 5 sec sweep and 6 sec listen_time total time=26 sec).

According to embodiments herein, in order to reduce the total line time per vibroseis source points the four sweeps, V1, V2, V3, V4 can be concatenated to eliminate the listening time for V1, V2, and V3. In that scenario, the total time for sweeping at four source locations is 26 seconds instead of 44 seconds. This is illustrated in FIG. 4. It should be appreciated that a savings of 16 second per shot location, in the context of a large land seismic survey is multiplied many thousands of times and produces a significant improvement in time efficiency, commercial viability, and success of a land seismic vibroseis survey.

If one or more vibrator units are not at the required locations due to different field conditions (ex. obstructions) the vibrators could sweep the same sequence of sweeps at the current locations, provided the x,y,z coordinates are recorded based on Global Positioning System (GPS) and altimetry measurements. That actuation method gives flexibility in operations and could minimize the non-productive time.

Figure 5:
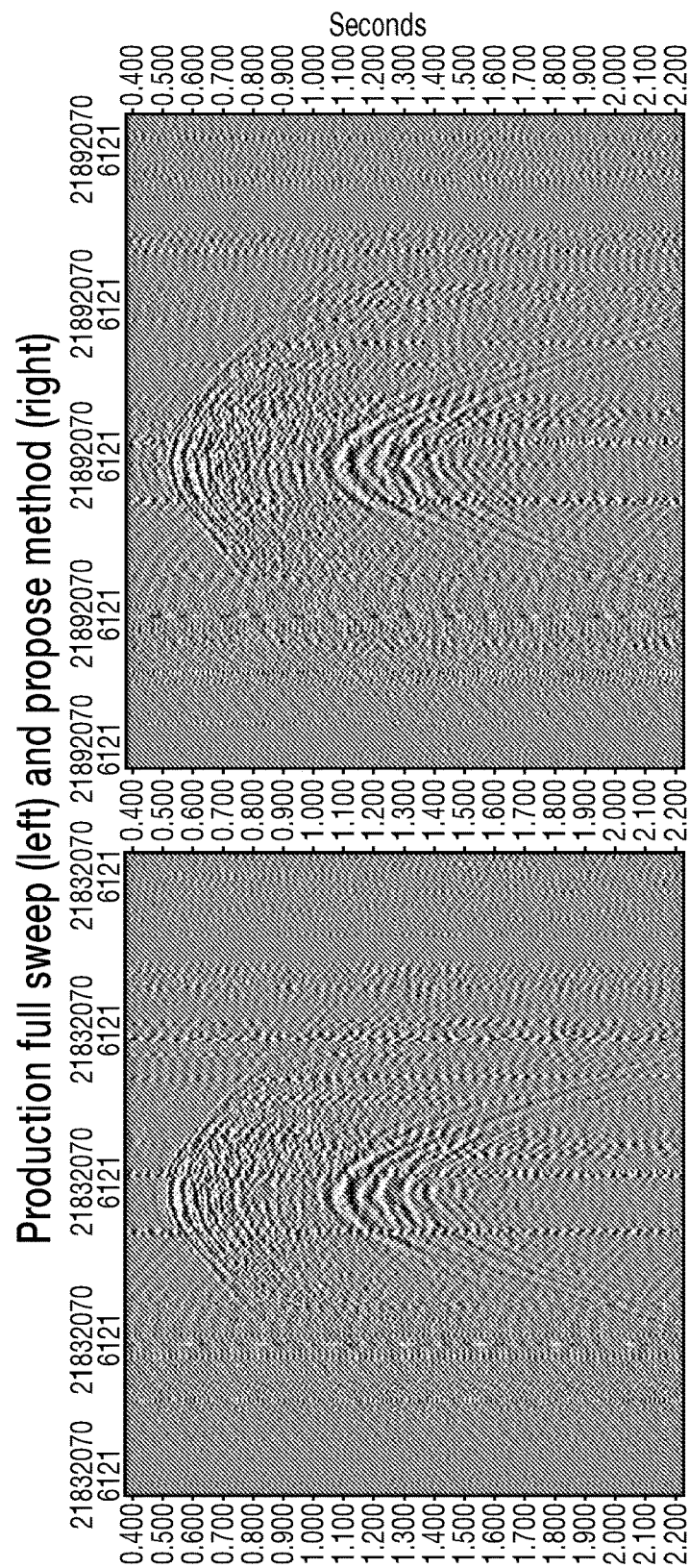
FIG. 5: shows examples of shot records for conventional acquisition (20 sec sweep, 6 listening) (left) vs. embodiments of the method described herein with encoded sweeps (right).

According to present embodiments, new methods and systems for performing land seismic vibroseis surveys are disclosed. However, no matter how efficient such a method is and what commercial improvements are realized, it is all for not if the actual seismic data results are inadequate. According to the present disclosure and according to experimentation it has been shown that survey results using the present embodiments are similar to, if not better than, conventional more inefficient methods. This is shown in FIG. 5. A comparison of data acquired with conventional acquisition (20 second length and 6 second listening time, one shot point at each time) vs shooting with four vibrators placed on four different lines, simultaneously, each vibrator shooting a different split bandwidth sweep (5 second length and 6 second listening time) is shown in FIG. 5.

While the present disclosure relates to a limited number of embodiments, those skilled in the art, having the benefit of this disclosure, will appreciate that numerous modifications and variations therefrom are possible while staying within the scope of the disclosure herein. It is intended that the appended claims cover such modifications and variations as fall within the true spirit and scope of the disclosure recited herein.

What is claimed is:

1. A method for performing a land seismic vibroseis survey, comprising:
    providing a first plurality of vibrators in a first group, wherein each vibrator in the first group is assigned to a respective source line of a first plurality of source lines, where the source lines of the first plurality of source lines run substantially parallel to one another;
    providing a second plurality of vibrators in a second group, wherein each vibrator in the second group is assigned to a respective source line of a second plurality of source lines that is different than the first plurality of source lines;
    actuating each vibrator of the first plurality of vibrators simultaneously, wherein each vibrator of the first plurality of vibrators uses a first set of frequency bandwidth sweeps and a first set of phase encodings, wherein the first set of frequency bandwidth sweeps comprises a different frequency bandwidth sweep for each vibrator of the first plurality of vibrators, wherein a first plurality of pairs of frequency bandwidth sweeps of the first set of frequency bandwidth sweeps comprises one or more overlapping frequencies, and wherein the first set of phase encodings comprises a different phase encoding for each vibrator of the first plurality of vibrators;
    actuating each vibrator of the second plurality of vibrators at the same time as each vibrator of the first plurality of vibrators, wherein each vibrator of the second plurality of vibrators uses a second set of frequency bandwidth sweeps and a second set of phase encodings, wherein the second set of frequency bandwidth sweeps comprises a different frequency bandwidth sweep for each vibrator of the second plurality of vibrators, and wherein the second set of phase encodings comprises a different phase encoding for each vibrator of the second plurality of vibrators, wherein each frequency bandwidth sweep of the first set of frequency bandwidth sweeps covers an exact same frequency range as each respective frequency bandwidth sweep of the second set of frequency bandwidth sweeps; and
    detecting one or more resulting seismic signals with a plurality of seismic sensors that are placed in contact with the earth and as part of a seismic spread.

2. The method of claim 1, comprising a third plurality of vibrators in a third group, wherein each vibrator of the third plurality of vibrators is assigned to a respective source line of a third plurality of source lines, where the source lines of the third plurality of source lines run substantially parallel to one another.

3. The method of claim 2, comprising a fourth plurality of vibrators in a fourth group, wherein each vibrator of the fourth plurality of vibrators is assigned to a respective source line of a fourth plurality of source lines, where the source lines of the fourth plurality of source lines run substantially parallel to one another.

4. The method of claim 1, wherein the source lines of the first group are not shared with the source lines of the second group.

5. The method of claim 2, wherein the source lines of the first group and the source lines of the third group are shared.

6. A method of seismic vibroseis surveying, comprising:
    a first vibrator group comprising four vibrators, V1, V2, V3 and V4, wherein each of the four vibrators is located on a different source line, wherein each different source line running parallel to one another,
    the V1 being actuated for a shot 1 between 2-27 Hz and at a phase of 0 degrees, V2 being simultaneously actuated for the shot 1 between 24-48 Hz and at a phase of 90 degrees, V3 being simultaneously actuated for the shot 1 between 45-69 Hz and at a phase of 180 degrees, and V4 being simultaneously actuated for the shot 1 between 66-90 Hz and at a phase of 270 degrees, wherein a plurality of the vibrator V1, the vibrator V2, the vibrator V3, and the vibrator V4 is simultaneously actuated with each other.

7. The method of claim 6, wherein:
    the V1 being actuated for a shot 2 between 24-48 Hz and at a phase of 90 degrees, V2 being simultaneously actuated for the shot 2 between 45-69 Hz and at a phase of 180 degrees, V3 being simultaneously actuated for the shot 2 between 66-90 Hz and at a phase of 270 degrees, and V4 being simultaneously actuated for the shot 2 between 2-27 Hz and at a phase of 0 degrees, wherein a plurality of the vibrator V1, the vibrator V2, the vibrator V3, and the vibrator V4 is simultaneously actuated with each other.

8. The method of claim 7, wherein:
    the V1 being actuated for a shot 3 between 45-69 Hz and at a phase of 180 degrees, V2 being simultaneously actuated for the shot 3 between 66-90 Hz and at a phase of 270 degrees, V3 being simultaneously actuated for the shot 3 between 2-27 Hz and at a phase of 0 degrees, and V4 being simultaneously actuated for the shot 3 between 24-48 Hz and at a phase of 90 degrees, wherein a plurality of the vibrator V1, the vibrator V2, the vibrator V3, and the vibrator V4 is simultaneously actuated with each other.

9. The method of claim 8, wherein:
    the V1 being actuated for a shot 4 between 66-90 Hz and at a phase of 270 degrees, V2 being simultaneously actuated for the shot 4 between 2-27 Hz and at a phase of 0 degrees, V3 being simultaneously actuated for the shot 4 between 24-48 Hz and at a phase of 90 degrees, and V4 being simultaneously actuated for the shot 4 between 45-69 Hz and at a phase of 180 degrees, wherein a plurality of the vibrator V1, the vibrator V2, the vibrator V3, and the vibrator V4 is simultaneously actuated with each other.

10. A system for performing a land seismic vibroseis survey, comprising:
    a first plurality of vibrators in a first group, wherein each vibrator in the first group is assigned to a respective source line of a first plurality of source lines, wherein each source line of the first plurality of source lines run substantially parallel to one another and each vibrator of the first plurality of vibrators is actuated simultaneously using a first set of frequency bandwidth sweeps and a first set of phase encodings, wherein the first set of frequency bandwidth sweeps comprises a different frequency bandwidth sweep for each vibrator of the first plurality of vibrators, wherein a first plurality of pairs of frequency bandwidth sweeps of the first set of frequency bandwidth sweeps comprises one or more overlapping frequency ranges, and wherein the first set of phase encodings comprises a different phase encoding for each vibrator of the first plurality of vibrators;

a second plurality of vibrators in a second group, wherein each vibrator in the second group is assigned to a respective source line of a second plurality of source lines, where each source line of the second plurality of source lines run substantially parallel to one another and each vibrator of the second plurality of vibrators is actuated simultaneously as each vibrator of the first plurality of vibrators, wherein each vibrator of the second plurality of vibrators uses a second set of frequency bandwidth sweeps and a second set of phase encodings, wherein the second set of frequency bandwidth sweeps comprises a different frequency bandwidth sweep for each vibrator of the second plurality of vibrators, and wherein the second set of phase encodings comprises a different phase encoding for each vibrator of the second plurality of vibrators, wherein each frequency bandwidth sweep of the first set of frequency bandwidth sweeps covers an exact same frequency range as each respective frequency bandwidth sweep of the second set of frequency bandwidth sweeps; and a plurality of seismic sensors configured to be placed in contact with the earth and as part of a seismic spread for detecting one or more resulting seismic signals.

11. The system of claim 10, wherein the first plurality of source lines is not shared with the second plurality of source lines.

12. The system of claim 10, comprising a third plurality of vibrators in a third group, wherein each vibrator in the third group is assigned to a respective source line of a third plurality of source lines, where each source line of the third plurality of source lines runs substantially parallel to one another.

13. The system of claim 12, comprising a fourth plurality of vibrators in a fourth group, wherein each vibrator in the fourth plurality of vibrators is assigned to a respective source line of a fourth plurality of source lines, wherein each source line of the fourth plurality of vibrators runs substantially parallel to one another.

14. The system of claim 12, wherein the first plurality of source lines and the third plurality of source lines are shared.

15. The system of claim 10, wherein the first plurality of vibrators comprises four vibrators, a vibrator V1, a vibrator V2, a vibrator V3, and a vibrator V4, wherein each of the four vibrators is located on a different source line running parallel to another source line, and wherein a first vibrator of the four vibrators is actuated for a shot 1 between 2-27 Hz and at a phase of 0 degrees, a second vibrator of the four vibrators is simultaneously actuated for the shot 1 between 24-48 Hz and at a phase of 90 degrees, a third vibrator of the four vibrators is simultaneously actuated for the shot 1 between 45-69 Hz and at a phase of 180 degrees, and a fourth vibrator of the four vibrators is simultaneously actuated for the shot 1 between 66-90 Hz and at a phase of 270 degrees, wherein a plurality of the vibrator V1, the vibrator V2, the vibrator V3, and the vibrator V4 is simultaneously actuated with each other.

16. The system of claim 15, wherein the first vibrator is actuated for a shot 2 between 24-48 Hz and at a phase of 90 degrees, the second vibrator of the four vibrators is simultaneously actuated for the shot 2 between 45-69 Hz and at a phase of 180 degrees, the third vibrator of the four vibrators is simultaneously activated for the shot 2 between 66-90 Hz and at a phase of 270 degrees, and the fourth vibrator of the four vibrators is simultaneously actuated for a shot 2 between 2-27 Hz and at a phase of 0 degrees, wherein a plurality of the vibrator V1, the vibrator V2, the vibrator V3, and the vibrator V4 is simultaneously actuated with each other.

17. The system of claim 16, wherein the first vibrator of the four vibrators is actuated for a shot 3 between 45-69 Hz and at a phase of 180 degrees, the second vibrator of the four vibrators is simultaneously actuated for the shot 3 between 66-90 Hz and at a phase of 270 degrees, the third vibrator of the four vibrators is simultaneously activated for the shot 3 between 2-27 Hz and at a phase of 0 degrees, and the fourth vibrator of the four vibrators is simultaneously actuated for the shot 3 between 24-48 Hz and at a phase of 90 degrees, wherein a plurality of the vibrator V1, the vibrator V2, the vibrator V3, and the vibrator V4 are simultaneously actuated with each other.

18. The system of claim 17, wherein the first vibrator of the four vibrators is actuated for a shot 4 between 66-90 Hz and at a phase of 270 degrees, the second vibrator of the four vibrators is simultaneously actuated for the shot 4 between 2-27 Hz and at a phase of 0 degrees, the third vibrator of the four vibrators is simultaneously actuated for the shot 4 between 24-48 Hz and at a phase of 90 degrees, and the fourth vibrator of the four vibrators is simultaneously actuated for the shot 4 between 45-69 Hz and at a phase of 180 degrees, wherein a plurality of the vibrator V1, the vibrator V2, the vibrator V3, and the vibrator V4 is simultaneously actuated with each other.

19. The system of claim 10, wherein each vibrator of the second plurality of vibrators is placed at a set of a plurality of sets of distances from each vibrator of the first plurality of vibrators, wherein the plurality of sets of distances are based on a survey design and modeling study to assure that an effect of seismic interference in a target zone is less than a threshold level.

20. The system of claim 10, wherein the second group has a different number of vibrators from the first group.

* * * * *